UNITED STATES PATENT OFFICE.

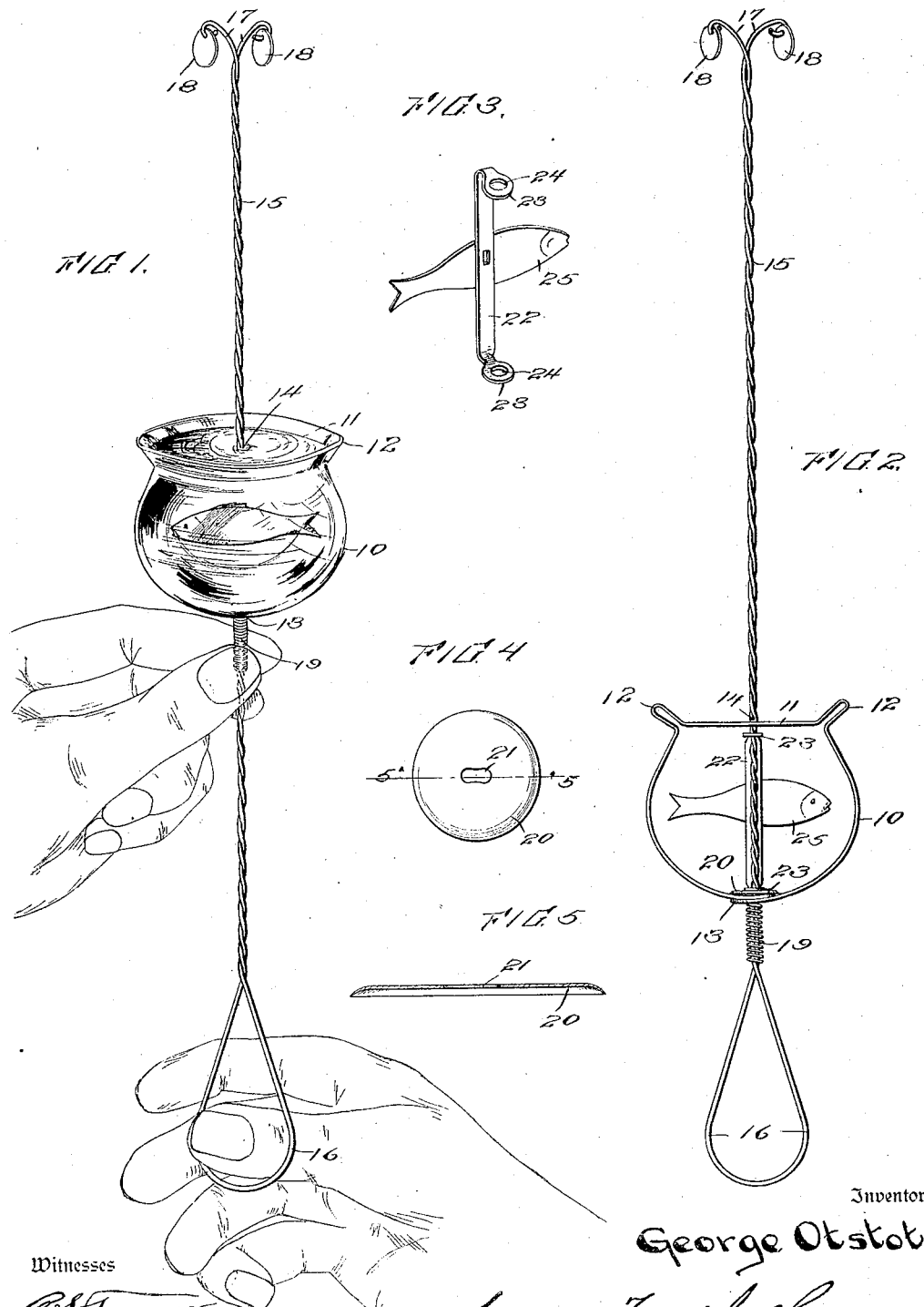

GEORGE OTSTOT, OF SPRINGFIELD, OHIO.

TOY.

1,124,794. Specification of Letters Patent. Patented Jan. 12, 1915.

Application filed January 15, 1914. Serial No. 812,309.

*To all whom it may concern:*

Be it known that I, GEORGE OTSTOT, a citizen of the United States, residing at Springfield, in the county of Clark and State of Ohio, have invented certain new and useful Improvements in Toys; and I do hereby declare the following to be a full, clear, and exact description of the invention, such as will enable others skilled in the art to which it appertains to make and use the same.

This invention relates to toys and has for an object to provide a toy which when manipulated represents a fish bowl with a fish swimming in the bowl.

A further object of the invention is to provide a band of metal having some shiny or reflecting surfaces thereon, said band being bent to conform to one of the major diametrical planes of a fish bowl with a spiral extending axially through such band with means when the spiral is moved in one direction relative to the band to cause the band to rotate in the circumference of the supposed fish bowl while the fish within the bowl moves also relative to the spiral and remains stationary or rotates independently and oppositely from the rotation of the band.

In the drawings, Figure 1 represents the device showing the band being rotated to produce the optical illusion of a complete transparent article of the shape of a fish bowl. Fig. 2 is a view of the device with the rotating band at rest. Fig. 3 is a perspective view of the fish and the means for supporting the same within the band. Fig. 4 is a view in plan of the washer or nut which slides on the spiral and causes rotation. Fig. 5 is a diametrical sectional view of the washer taken on line 5—5 of Fig. 4.

Like charcters of reference designate corresponding parts throughout the several views.

The improved toy which forms the subject matter of this application comprises a band 10 in the form of a strip of metal preferably having the exterior side of said band of a silver or tin color while the inside of the band is painted or enameled green. The band is composed of a single piece of metal having the top bent substantially straight as shown at 11 and the sides curved on approximately the lines of a circle. Intermediate the straight portion 10 and the curved portions are ears or folds 12 and the same is completed by overlapping the ends as indicated at 13 and perforating the overlapped ends. Preferably also the perforating is done with a press which turns the bur outwardly to form a riveting.

Through the straight portion 11 a perforation 14 is provided in axial alinement with the perforation 13 and through such alined perforations a spiral 15 is inserted. This spiral 15 may be produced in any desired manner but for economy and convenience is preferably composed of two wires twisted about a common axis with a loop 16 forming a handle at the lower end and with the upper ends manipulated in some manner to produce a stop for the band 10 shown here as having such ends turned outwardly as at 17. As shown in the drawing disks 18 are also hung upon these outwardly turned ends in the form of bangles but these disks form no part of the present invention.

Slidable upon the spiral 15 is a sleeve 19 formed in any approved manner here shown as composed of a wire helix but it is to be understood that the form of sleeve is wholly immaterial to the present invention. By grasping the sleeve firmly in one hand and the handle 16 in the other hand as shown at Fig. 1 the sleeve may be pushed upwardly along the spiral carrying the band 10 therewith both being free to slide upon the spiral.

Within the circumference of the band 10 a washer or nut 20 is employed having an elongated opening 21 of such nature as to fit over the spiral and prevent such nut from rotating on the spiral. When the sleeve 19 is moved upwardly carrying therewith the band 10 the band is caused to engage against the nut 20 which makes frictional engagement with the inside of such band and is rotated by being moved upwardly along the spiral rotating the band therewith. When upward motion on the sleeve has been released the clamping action of the nut upon the band is also released and the band is free to rotate independently of any motion whatever of the spiral, sleeve or nut. When, therefore, the sleeve is pushed upwardly with a quick action it serves to impart rotary motion to the band, which motion is continued by its own momentum after movement of the sleeve and nut have been discontinued.

As the form of the band is such as to correspond with one of the diametrical planes of a fish bowl it is obvious that the rotation of such band upon its axis will describe the exterior of a fish bowl and owing to the rotation of the same the reflecting exterior and the green interior it causes the optical illusion of a glass fish bowl with a green tinted water within the bowl. Mounted also upon the spiral is a bar 22 having its opposite ends turned at right angles as indicated at 23 with perforations 24 therein of such size that the bar is free to move slidably also upon the spiral. Upon the side of this bar is secured a piece of metal or other material cut in the form of a fish as indicated at 25, the fish being secured to the bar in any approved manner. It will be obvious, therefore, that as the nut, band and sleeve are moved upwardly along the spiral the fish carried by its bar will also be moved upwardly and will be given a slight rotating motion by the rotation of the nut upon which it bears at the lower end. As the nut rotates in opposite directions when going upwardly and downwardly along the spiral the fish resting upon such nut will when going up tend to rotate in the same direction as the rotation of the band and when coming down tend to rotate in the opposite direction so that the fish is given an apparently swimming motion or opposite whirling motion within the bowl.

While the operation of the device has been described as moving the bowl and other parts upwardly along the spiral it is obvious that the same results will be accomplished by holding the sleeve 19 stationary and moving the spiral upwardly and downwardly. By this latter means of manipulation the bowl is given a stationary appearance which is more desirable as an illusion than when the bowl is itself moved upwardly and downwardly along the spiral. The mechanical movements involved in the two operations are, however, identical.

I claim:

1. In a toy, a strip bent to correspond to the periphery of a diametrical plane of a fish bowl; a spiral extending through perforations in the axis of said strip; a sleeve without the strip free to move upon the spiral; a nut within the strip having an opening corresponding to a cross section of the spiral; a bar extending longitudinally of the spiral within the band and free to move relative to the spiral; and a sheet cut in the representation of a fish secured to the bar.

2. A toy comprising a spiral spindle, a flexible and resilient band encircling the same and rotatable there around, an object mounted upon the spindle and surrounded by said band, a washer secured upon the spindle between said band and said object, said washer being provided with a perforation, having parts which seat in the spiral grooves upon said spindle, and a sleeve encircling the spindle and adapted to engage the underside of said band.

3. A toy comprising a spiral spindle, a flexible and resilient band encircling the same and rotatable there around, an object mounted upon the spindle and surrounded by said band, a washer secured upon the spindle between said band and said object, said washer being provided with a perforation, having parts which seat in the spiral grooves upon said spindle, and a sleeve encircling the spindle and adapted to engage the underside of said band, the inner surface of said band being colored and the outer surface thereof being shiny.

In testimony whereof I affix my signature in presence of two witnesses.

GEORGE OTSTOT.

Witnesses:
C. S. OLINGER,
ZOE G. JOHNSON.

Copies of this patent may be obtained for five cents each, by addressing the "Commissioner of Patents, Washington, D. C."